(12) United States Patent
Kakui (10) Patent No.: US 8,290,004 B2
(45) Date of Patent: Oct. 16, 2012

(54) LASER LIGHT SOURCE

(75) Inventor: Motoki Kakui, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 12/768,241

(22) Filed: Apr. 27, 2010

(65) Prior Publication Data

US 2010/0272136 A1    Oct. 28, 2010

(30) Foreign Application Priority Data

Apr. 27, 2009  (JP) ................... P2009-107760

(51) Int. Cl.
*H01S 3/30* (2006.01)
(52) U.S. Cl. ........................ 372/6; 372/25; 372/29.011
(58) Field of Classification Search ................ 372/6, 25, 372/29.011
See application file for complete search history.

(56) References Cited

U.S. PATENT DOCUMENTS

| | | | |
|---|---|---|---|
| 5,838,709 A * | 11/1998 | Owa ............................... | 372/68 |
| 6,813,065 B2 * | 11/2004 | Tsuzaki et al. ................ | 359/334 |
| 6,901,090 B1 * | 5/2005 | Ohtsuki ......................... | 372/26 |
| 2006/0257150 A1 * | 11/2006 | Tsuchiya et al. ................ | 398/79 |
| 2007/0268570 A1 * | 11/2007 | Kakui .......................... | 359/337.4 |
| 2008/0130101 A1 * | 6/2008 | Kakui .......................... | 359/341.3 |
| 2008/0175279 A1 * | 7/2008 | Kakui .............................. | 372/10 |
| 2008/0180788 A1 * | 7/2008 | Kakui et al. .................. | 359/345 |
| 2008/0304137 A1 * | 12/2008 | Kakui et al. .................. | 359/341.3 |
| 2009/0010288 A1 * | 1/2009 | Keaton et al. .................... | 372/25 |

FOREIGN PATENT DOCUMENTS

JP    2001-358087    12/2001

* cited by examiner

*Primary Examiner* — Yuanda Zhang
(74) *Attorney, Agent, or Firm* — Venable LLP; Michael A. Sartori; Steven J. Schwarz (57) ABSTRACT

The present invention relates to a laser light source having a structure for effectively suppressing generation of an optical surge upon a restart after suspension of output of pulsed light. The laser light source comprises a first light source outputting light with a first wavelength as pulsed light, a second light source outputting light with a second wavelength different from the first wavelength, an optical amplification fiber as an optical amplifier amplifying the pulsed light outputted from the first light source and the light outputted from the second light source, and a control unit controlling the output of the light from the second light source in accordance with the light output from the first light source. The first light source has an ON state in which repetitive output of the pulsed light on a fixed cycle starts and continues, and an OFF state in which the output of the pulsed light is suspended during a duration of not less than the fixed cycle. The control unit controls the second light source to output the light to the optical amplification fiber during the duration of the first light source being in the OFF state, so as to suppress a rise of population inversion of a rare earth element added in the optical amplification fiber.

5 Claims, 8 Drawing Sheets

| SCAN IN X-AXIS DIRECTION | SCAN IN Y-AXIS DIRECTION | FIRST LIGHT SOURCE (WAVELENGTH:1064 nm) | SECOND LIGHT SOURCE (WAVELENGTH:1030 nm) |
|---|---|---|---|
| 1 | 0 | ON | OFF |
| 0 | 1 | OFF | ON |
| 1 | 1 | ON | ON |
| 0 | 0 | ON | ON |

*Fig.7*

| SCAN IN X-AXIS DIRECTION | SCAN IN Y-AXIS DIRECTION | FIRST LIGHT SOURCE (WAVELENGTH:1064 nm) | SECOND LIGHT SOURCE (WAVELENGTH:1030 nm) |
|---|---|---|---|
| 1 | 0 | ON | OFF |
| 0 | 1 | ON | ON |
| 1 | 1 | ON | ON |
| 0 | 0 | ON | ON |

Fig.8

LASER LIGHT SOURCE

BACKGROUND OF THE INVENTION

1. Field of the Invention

The present invention relates to a high-output laser light source which outputs pulsed light amplified by using an optical amplifier, and is applied to processing use, medical use, and so on.

2. Related Background Art

In many fields of laser processing, medical treatment, measurement or the like, there are demands for pulsed laser light having a short pulse width and a high pulse peak power and allowing for a fast repetition rate. In the laser processing field, the pulsed laser light is often implemented by Q-switching. In a Q-switched pulsed laser light source, however, there is a limit in shorter pulse generation and it is also difficult to achieve fast repetition rates because the pulse width is equivalent to a duration of time in which light travels back and forth multiple times in an optical resonator. For this reason, attention is being drawn to laser light sources using a MOPA (Master Oscillator Power Amplifier) system in which a seed light source is a pulse-modulated semiconductor laser or the like and in which an optical amplifier is located downstream thereof. It is known that when the MOPA system is adopted for the laser light source, there is an effect that it is easy to realize a high gain and stable diffraction-limited beam quality, by composing the optical amplifier part of an optical fiber amplifier wherein an optical amplification medium is an optical fiber doped with a rare earth element.

However, when the pulse operation is suspended in use of the pulsed laser light source of the MOPA system, a halt of output of pulsed light from the seed light source raises a population inversion to the extreme in the optical fiber which is the optical amplification medium included in the optical fiber amplifier and doped with the rare earth element. Therefore, an optical surge, which is a temporary increase in optical power of outputted light, can be generated upon a restart of the pulse operation. A method of blocking the pulsed laser light after the restart of output is under research, for example as described in Japanese Patent Application Laid-Open No. 2001-358087, as a method for preventing a workpiece from being irradiated with the laser light of the optical surge thus generated.

SUMMARY OF THE INVENTION

The present inventors have examined the above conventional laser light sources in detail, and as a result, have discovered the following problems.

Namely, the generation of the above-described optical surge can also affect something other than the workpiece to be irradiated with the laser light. For example, the generation of the optical surge can cause a failure in the laser light source. It is also conceivable to adopt a method of terminating the operation of the optical fiber amplifier, but it is difficult to achieve stable operation in a short time because a warm-up operation before thermal equilibrium takes a certain time in again pumping the optical fiber amplifier. As described above, it is desired to provide a laser light source that can suppress the generation of the optical surge after the restart and that can output pulsed light of constant intensity on a stable basis in the situation where the output of pulsed light from the laser light source using the MOPA system is suspended.

The present invention has been developed to eliminate the problems described above. It is an object of the present invention to provide a laser light source that has a structure for effectively suppressing the generation of the optical surge upon the restart after suspension of the output of pulsed light.

In order to achieve the above object, a laser light source according to the present invention comprises a first light source, a second light source, an optical amplifier, and a control unit. The first light source outputs light with a first wavelength as pulsed light. The second light source outputs light with a second wavelength different from the first wavelength. The optical amplifier amplifies the light outputted from the first light source and the light outputted from the second light source. The control unit controls the output of the light from the second light source in accordance with the output of the light from the first light source.

Particularly, in the laser light source according to the present invention, the first light source has an ON state in which repetitive output of the pulsed light on a fixed cycle starts and continues, and an OFF state in which the output of the pulsed light is suspended during a duration of not less than the fixed cycle. The control unit controls the second light source to output the light to the optical amplifier during the duration of the first light source being in the OFF state.

In the laser light source according to the present invention as described above, for example when an optical fiber amplifier is adopted as the optical amplifier, the light from the second light source is outputted to an optical amplification fiber while the first light source is in the OFF state in which the output of pulsed light from the first light source is suspended during the duration of not less than the fixed cycle. In this case, the population inversion is suppressed in the optical amplification included in the optical amplifier, and therefore the generation of the optical surge is effectively prevented when the first light source is turned into the ON state in which the repetitive output of pulsed light on the fixed cycle from the first light source starts and continues.

The laser light source according to the present invention may further comprise a filter. The filter transmits the light with the first wavelength but blocks the light with the second wavelength out of amplified light outputted from the optical amplifier. When the laser light source further comprises the filter as described above, the light outputted from the second light source and amplified by the optical amplifier is effectively prevented from being outputted to the outside of the laser light source.

The control unit may be configured to control the second light source to halt the output of light at the time when a state of the first light source changes from OFF to ON or during a duration of the first light source being in the ON state. When the output of light from the second light source is halted with the first light source being in the ON state as described above, the laser light can be outputted to the outside of the laser light source, without suppressing peak powers of the pulsed light outputted from the first light source.

The optical amplifier is preferably configured to include an optical fiber doped with an optical amplification element, as an optical amplification medium. The optical amplifier is preferably configured so that a rise time of the light outputted from the second light source is set to be a time of 50% to 200% of a pumped-state lifetime of the optical amplification element.

DESCRIPTION OF THE PREFERRED EMBODIMENTS

In the following, embodiments of a laser light source according to the present invention will be explained in detail with reference to FIGS. 1, 2, 3A to 4B and 5 to 8. In the description of the drawings, identical or corresponding components are designated by the same reference numerals, and overlapping description is omitted.

(First Embodiment)

Figure 1:
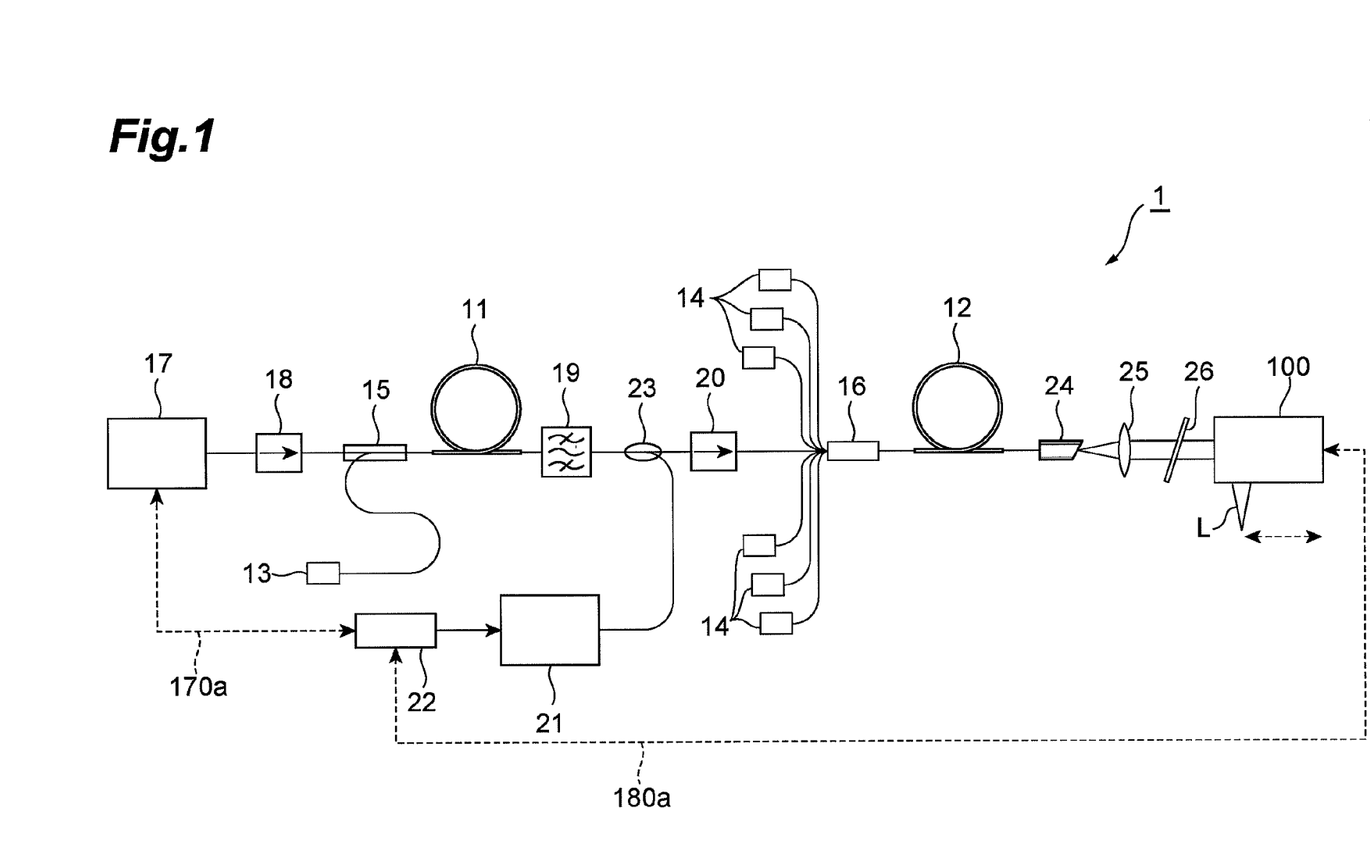
FIG. 1 is a view showing a configuration of a first embodiment of a laser light source according to the present invention.

The first embodiment of the laser light source according to the present invention will be described. FIG. 1 is a view showing a configuration of the laser light source 1 according to the first embodiment. As shown in FIG. 1, the laser light source 1 comprises optical amplification fibers 11, 12, pump light sources 13, 14, combiners 15, 16, a first light source 17, optical isolators 18, 20, a band-pass filter 19, a second light source 21, a control unit 22, a WDM (Wavelength Division Multiplexing) coupler 23, an end cap 24, a lens 25, and an LWPF (Long Wavelength Pass Filter) 26.

In the laser light source 1, when pump light beams outputted from the pump light sources 13, 14 are inputted into the optical amplification fibers 11, 12, each of the optical amplification fibers 11, 12 turns into a pumped state. This results in amplifying seed light outputted from the first light source 17 of a seed light source in the light-amplifying fibers 11, 12, and the amplified light is outputted from the laser light source 1. Namely, the laser light source 1 has the MOPA (Master Oscillator Power Amplifier) structure.

There is no particular restriction on the first light source 17 as long as it is a light source capable of outputting pulsed light of the seed light; however, a YAG laser light source or the like is suitably applicable. The first light source 17 in the present embodiment outputs the pulsed light (seed light) with the wavelength of 1064 nm at about 700 mW, with supply of a drive current of about 200 mA. In the 1060 nm wavelength band of the seed light, each of the optical amplification fibers 11, 12 has a gain.

An active medium for optical amplification is preferably the element Yb which has a gain around the wavelength of 1060 nm compatible with existing YAG laser light sources and which is advantageous in terms of power conversion efficiency because the wavelength of pump light is close to the wavelength of light to be amplified. Therefore, the optical amplification fibers 11, 12 are desirably YbDFs (Yb-Doped Fibers) having a core doped with Yb. The optical amplification part in the laser light source 1 is constituted by a preamplifier part including the optical amplification fiber 11, and a booster amplifier part including the optical amplification fiber 12.

The preamplifier part is constituted by the optical amplification fiber 11, the pump light source 13, and the combiner 15 for guiding the pump light from the pump light source 13 to the optical amplification fiber 11. The booster amplifier part is constituted by the optical amplification fiber 12, a plurality of pump light sources 14, and the combiner 16 for guiding pump light beams from the pump light sources 14 to the optical amplification fiber 12.

In the preamplifier part, the optical amplification fiber 11 amplifies the seed light from the first light source 17 which has traveled successively through the optical isolator 18 and the combiner 15 and has reached the optical amplification fiber 11. On the other hand, the pump light outputted from the pump light source 13 including a pump LD module is supplied in the forward direction through the combiner 15 into the optical amplification fiber 11. The pump light has the wavelength of 975 nm and the power of 5 W class. The optical amplification fiber 11 is a phosphate-based YbDF whose core is doped with phosphorus (P) having a concentration of 26.4 wt % and aluminum (Al) having a concentration of 0.8 wt % and is pumped. The optical amplification fiber 11 has the core diameter of 10 μm, the diameter of a first cladding of about 125 μm, an unsaturated absorption coefficient of 1.8 dB/m at the wavelength of 915 nm, and the length of 3.4 m. The band-pass filter 19 is located downstream of the optical amplification fiber 11, in order to suppress wavelengths other than the light outputted from the seed light source (first light source 17).

The multiplexer 23 is provided downstream of the band-pass filter 19 in the preamplifier part. The multiplexer 23 multiplexes the light outputted from the first light source 17 and amplified by the optical amplification fiber 11, with the light outputted from the second light source 21. Multiplexed light resulting from multiplexing in the multiplexer 23 is outputted via the optical isolator 20 and combiner 16 to the optical amplification fiber 12 of the booster amplifier part.

The second light source 21 is a light source that continuously outputs laser light with the wavelength of 1030 nm. The output of the light from the second light source 21 is controlled by the control unit 22. The control unit 22 receives through a line 170a, information such as a start (OFF state→ON state) and a stop (ON state→OFF state) of output of the seed light (pulsed light) from the first light source 17 and controls the output of the laser light (e.g., CW light) from the second light source 21, based on the information. The details of a control method by the control unit 22 will be described later.

In the booster amplifier part, the optical amplification fiber 12 amplifies the light having passed through the combiner 16. The pump light beams supplied in the forward direction from the respective pump light sources 14 via the combiner 16 into the optical amplification fiber 12 have the wavelength of 975 nm and power of 5 W class. Namely, the power of the pump light beams supplied into the optical amplification fiber 12 is 30 W. The optical amplification fiber 12 is an Al-codoped silica-based YbDF whose core is doped with aluminum (Al) having a concentration of 1.5 wt % and is pumped. The optical amplification fiber 12 has the core diameter of 10 μm, the diameter of a first cladding of about 125 μm, an unsaturated absorption coefficient of 1.5 dB/m at the wavelength of 915 nm, and the length of 4 m.

Figure 2:
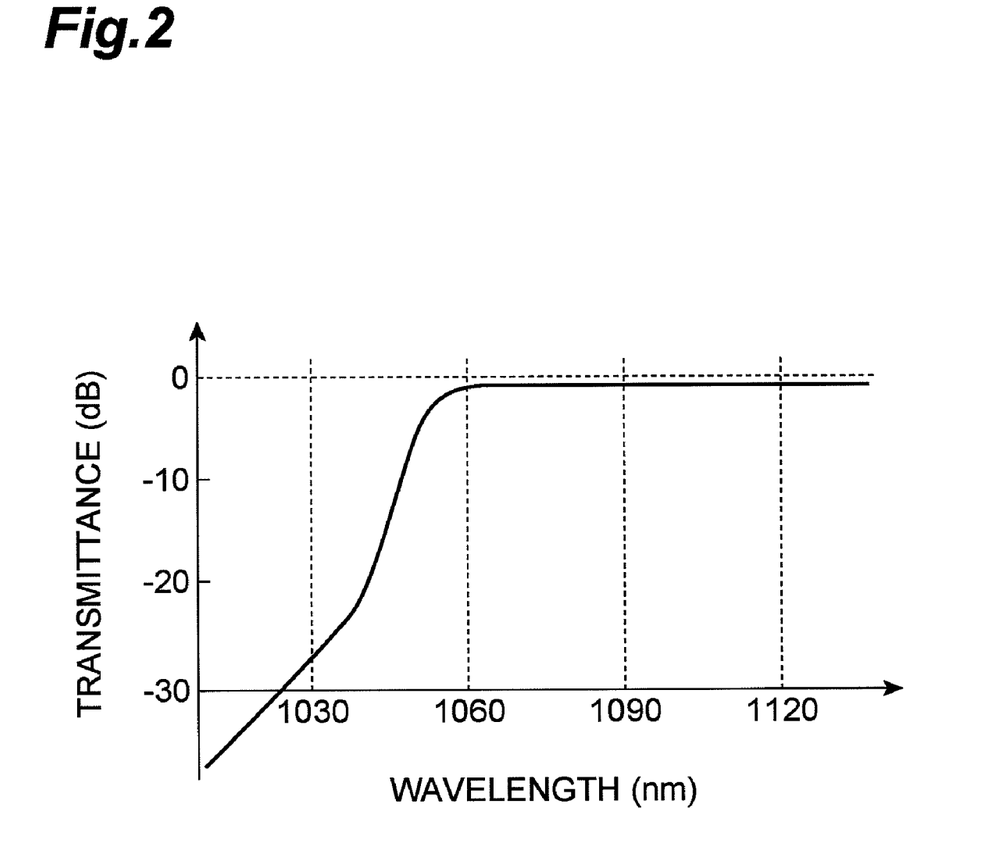
FIG. 2 is a view showing LWPF 26 included in the laser light source (FIG. 1) according to the first embodiment.

The end cap 24 is disposed further downstream of the optical amplification fiber 12. The end cap 24 outputs light amplified by the optical amplification fiber 12. Furthermore, the lens 25 and LWPF 26 are disposed downstream of the end cap 24. The light outputted from the end cap 24 is collimated by the lens 25 and the collimated light is then inputted into the LWPF 26. The LWPF 26 is a long-wavelength transmitting filter, and a transmission property thereof is as shown in FIG. 2. When the wavelength (second wavelength) of the light outputted from the second light source is assumed to be a wavelength shorter than the wavelength (first wavelength) of the light outputted from the first light source, the transmission property of LWPF 26 is set so as to transmit the light of the first wavelength and remove the light of the second wavelength. Light having passed through the LWPF 26 having such a transmission property is outputted as pulsed light from the laser light source 1. A band-pass filter can be used in place of the LWPF 26, as a filter capable of transmitting the light of the first wavelength only, for the purpose of simply removing the light of the second wavelength. However, in the case that the laser light is outputted with a high power, there is a case where light of components near the wavelength of 1100 nm is generated by nonlinear effect such as Stimulated Raman Scattering (SRS) in the optical amplification fibers 11, 12. Light of such long-wavelength components can also contribute to laser processing. In the case that the light of long-wavelength components is to be utilized, it is preferable to use the LWPF capable of transmitting the long-wavelength components.

Figure 3A:
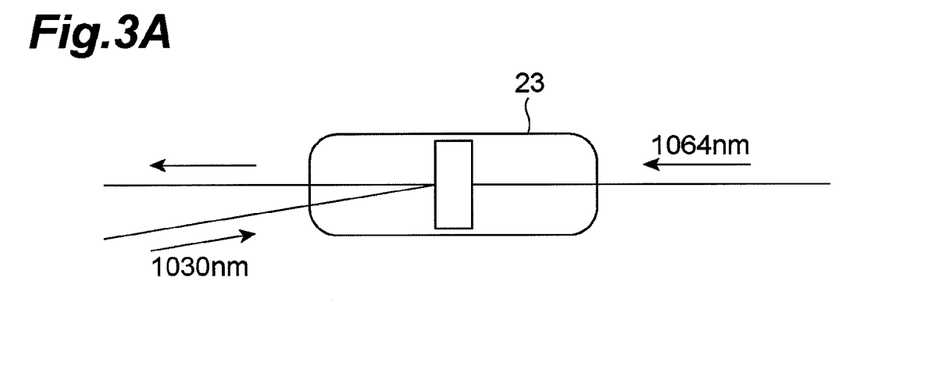
FIGS. 3A and 3B are views showing a multiplexer 23 included in the laser light source (FIG. 1) according to the first embodiment.
Figure 3B:
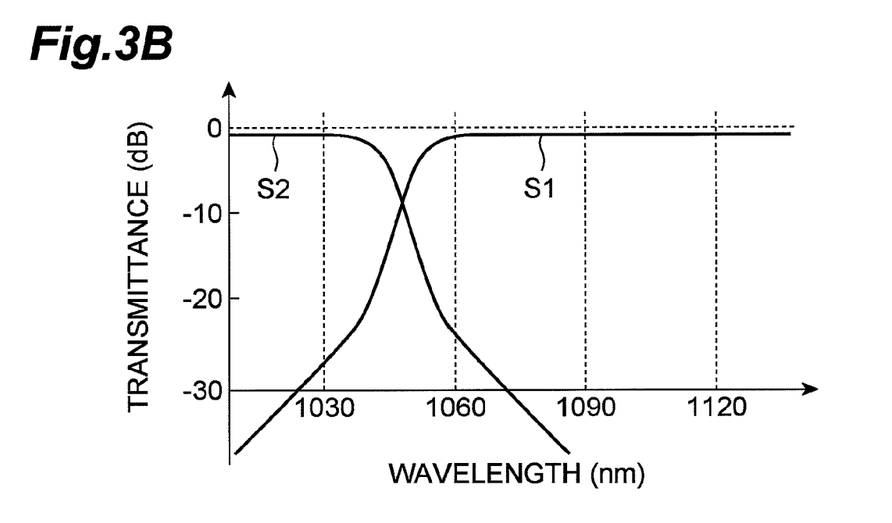

FIGS. 3A and 3B are views showing the multiplexer 23. FIGS. 3A and 3B show a case where a WDM filter is used as the multiplexer 23. Particularly, as shown in FIG. 3A, input ports of the light beams from the first light source 17 and from the second light source 21 are arranged at opposite positions with respect to the multiplexer 23. FIG. 3B is a view showing characteristics of the WDM filter. In FIG. 3B, curve S1 indicates transmittances of light at respective wavelengths of the WDM filter and curve S2 reflectances of light at respective wavelengths of the filter. As shown in FIG. 3B, the light with the wavelength of 1064 nm outputted from the first light source 17 can be transmitted by the multiplexer 23 and outputted to an output port. On the other hand, the light with the wavelength of 1030 nm outputted from the second light source 21 is reflected in the WDM filter and is outputted to the output port with little transmission to the input port of the light from the first light source 17. For this reason, as shown in FIG. 3A, the light beams outputted from the first light source 17 and the second light source 21 can be outputted in an identical direction while the first light source 17 and the second light source 21 are arranged so as to be opposed with respect to the multiplexer 23. Such a configuration allows the multiplexer 23 to multiplex the light outputted from the first light source 17 with the light outputted from the second light source 21 and to output the multiplexed light to the optical isolator 20. The multiplexer 23 may also be a WDM coupler, instead of the WDM filter. The WDM coupler is a fused fiber coupler in which fibers are fused and spliced, which is inexpensive and compact.

An irradiation direction of the laser light outputted from the laser light source 1 is controlled, as shown in FIG. 1, by a galvano scanner 100 and others arranged downstream of the end cap 24 and with the lens 25 and LWPF 26 in between the end cap 24 and the galvano scanner 100. The control unit 22 also receives operation information of the galvano scanner 100 through a line 180a.

Figure 4A:
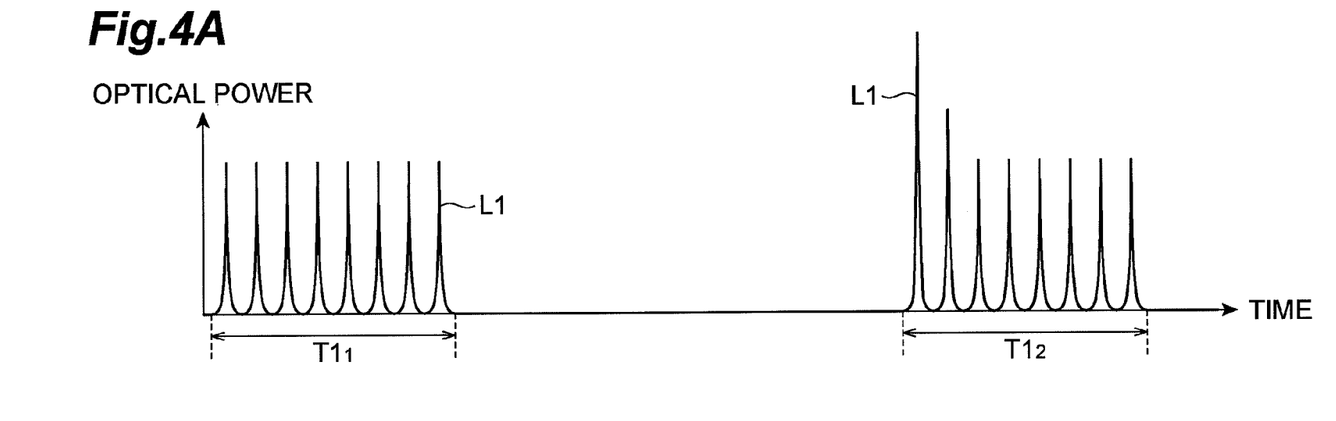
FIGS. 4A and 4B are views showing the output of laser light from the laser light source (FIG. 1) according to the first embodiment.
Figure 4B:
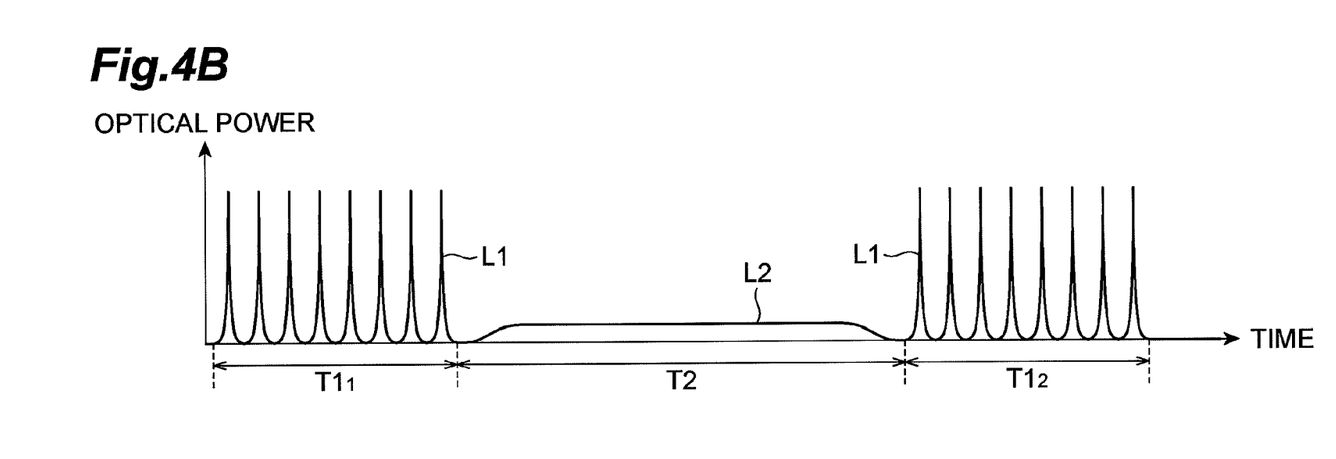
Figure 5:
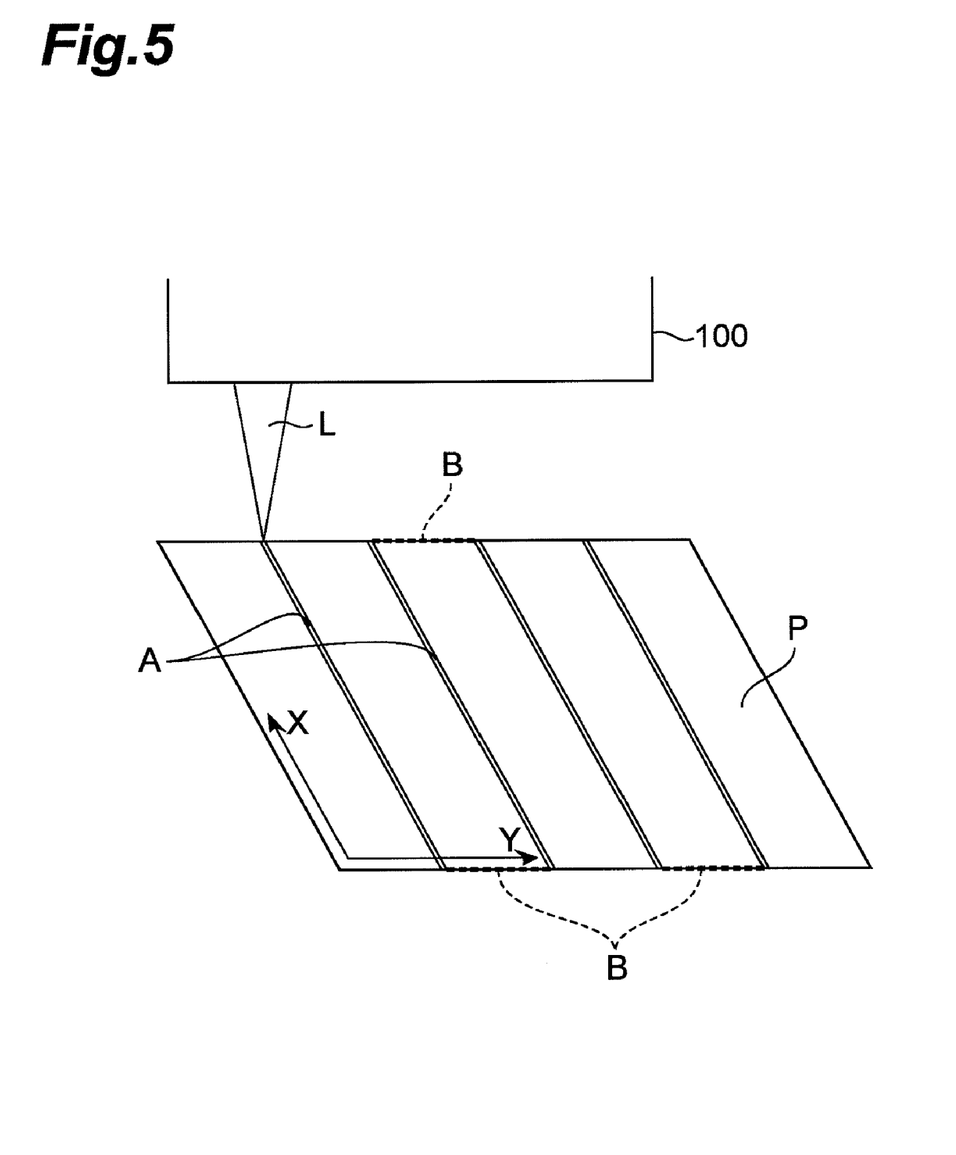
FIG. 5 is a view showing laser processing by the laser light source (FIG. 1) according to the first embodiment.

The below will describe output timings of the respective light beams from the first light source 17 and from the second light source 21, using FIGS. 4A, 4B, and 5. FIGS. 4A and 4B are views showing output powers of the respective laser beams outputted from the laser light source 1. FIG. 5 is a view showing an example of processing a workpiece with the laser light source 1.

The present embodiment will describe a case where a surface of workpiece P is processed with the laser light outputted from the laser light source 1, as shown in FIG. 5. In particular, a surface of workpiece P of a flat plate shape is processed in a plurality of linear regions along a direction parallel to the X-axis (portions A in FIG. 5 are target regions) with the laser light L outputted from the laser light source 1. An irradiation region of the laser light source 1 moves on regions (portions B in FIG. 5) connecting between ends of adjacent portions A, which are located at the side edges in the Y-axis direction of the workpiece P. In this arrangement, the irradiation region of the laser light source 1 alternately moves on portions A as processed objects and on portions B as unprocessed objects, whereby the plurality of processed portions (portions A) parallel to the X-axis can be processed with the laser light L. In this operation, it is necessary to suspend the irradiation with the laser light L during durations in which the irradiation region of the laser light source 1 moves on portions B.

For processing the workpiece P, as shown in FIG. 4A, the first light source 17 outputs the pulsed light of the wavelength of 1064 nm (ON state) and the laser light source 1 outputs pulsed laser light L1 resulting from amplification of the pulsed light, in an ON time zone (time zone indicated by time $T1_1$ in FIG. 4A) in which the irradiation region with the laser light outputted from the laser light source 1 is located on portion A in FIG. 5. Next, the galvano scanner 100 halts the output of the pulsed light from the first light source 17 during a duration in which the irradiation region with the laser light from the laser light source 1 is located on portion B in FIG. 5 (OFF state). This results in suspending the output of the pulsed laser light L1 from the laser light source 1. During this suspension period, however, the population inversion of the rare earth element added in the optical amplification fiber 12 could rise to the extreme and this would lead to a temporary sharp rise of the output power of the pulsed laser light L1 at a point of a restart of the irradiation with the pulsed laser light L1 from the laser light source 1 (a point of a start of time $T1_2$) at which the irradiation region of the laser light L from the laser light source 1 again comes on portion A in FIG. 5; it would result in generating an optical surge. When a huge optical surge is generated, it could cause failure, breakage, or the like in each part of the laser light source 1.

In contrast to it, the laser light source 1 according to the present embodiment is configured to output the light from the second light source 21 during an OFF time zone (time zone indicated by time T2) in which the output of the seed light (pulsed light) from the first light source 17 is suspended for a duration of not less than the pulse cycle of the pulsed light (which is an OFF state), as shown in FIG. 4B. Then, the light outputted from the second light source 21 is amplified by the optical amplification fiber 12. The laser light L2 amplified by the optical amplification fiber 12 is guided through the end cap 24 and lens 25 into the LWPF 26. Most of the laser light L2 outputted from the second light source 21 is blocked by the LWPF 26. In cases where the laser light L2 is utilized in processing or the like or where the laser light L2 is harmless to the irradiation target, the filter such as the LWPF 26 may be omitted. As described above, the light outputted from the second light source 21 is inputted into the optical amplification fiber 12 during the OFF time zone to expend the pump light inputted into the optical amplification fiber 12, and this suppresses the marked rise of the population inversion of the rare earth element added in the optical amplification fiber 12.

As a result of this, the generation of the huge optical surge of the pulsed laser light L1 can be suppressed at the point of the restart of the output of the pulsed light from the first light source 17 (point of the start of the time T1$_2$).

The output of the light from the second light source 21 is preferably started without a temporal gap, after the suspension of the output of the pulsed light from the first light source 17. In the case that there is a temporal gap between the suspension time of the output of the pulsed light from the first light source 17 and the start time of the output of the light from the second light source 21 (i.e., a case that there is a time zone without the output of light from the both light sources), the population inversion of the rare earth element added in the optical amplification fiber 12 will rise during the gap. In that case, an optical surge might be generated upon a start of output of the light from the second light source 21. For preventing it, it is preferable to start the output of the light from the second light source 21 with a temporal gap equal to or shorter than the output cycle of the pulsed light outputted from the first light source 17, after the suspension of the output of the pulsed light from the first light source 17. More specifically, in a case where the repetition frequency of the pulsed light outputted from the first light source 17 is 100 kHz, a time of one pulse cycle is 10 μs and it is thus preferable to start the output of the laser light from the second light source 21 within the time of one pulse cycle, or within 10 μs after the suspension of the output of the pulsed light from the first light source 17.

It is also possible to adopt a mode in which the output of the laser light from the second light source 21 is started earlier by a time of 50-200% of the pumped-state lifetime of the rare earth element added in the optical amplification fiber 12 than the point of time when the first light source 17 goes into the ON state, i.e., to adopt a mode in which a rise time of the light outputted from the second light source 21 is set to a time of 50%-200% of the pumped-state lifetime of the rare earth element.

In the case where the laser light from the second light source 21 is outputted, when a required time (rise time) until the output intensity of the laser light reaches a fixed value is too short, it could cause an optical surge. When the rise time is too late, it will be difficult to satisfactorily suppress the rise of the population inversion of the rare earth element. For this reason, the rise time associated with the output of the laser light from the second light source 21 (which is a required time from a state of intensity of 10% to intensity of 90% of the required output intensity) is preferably approximately equal to 100 μs which is the pumped-state lifetime of Yb ions to induce optical amplification action in the optical amplification fiber 12. However, the rise time associated with the output of the laser light from the second light source 21 may be set to 50-200% of the pumped-state lifetime.

The control about the output of the laser light from the first light source 17 and the second light source 21 is preferably carried out in conjunction with the control of the operation of the galvano scanner 100. For example, when the control unit 22 of the laser light source 1 sends a control signal about the operation of the galvano scanner 100 to the galvano scanner 100 to scan the beam with control of the irradiation position of the laser light after amplification that is outputted from the laser light source 1, control signals about the laser light outputs from the first light source 17 and the second light source 21 are also concurrently sent to the laser light source 1. More specifically, when the scanning direction of the laser light from the laser light source 1 is changed from the X-axis direction (portion A as a processing target region) to the Y-axis direction (portion B as an unprocessed region) in FIG. 5, a control signal associated with the output of the laser light is also sent to the control unit 22 to control the outputs of the laser light beams from the first light source 17 and the second light source 21, whereby the outputs of the laser light beams from the first light source 17 and the second light source 21 can be controlled. Another available method is a mode in which signals associated with actuation (scanning state) and stop of motors of the galvano scanner to control respective motions in the X-axis direction and in the Y-axis direction are outputted to the outside and in which the outputs of the laser light beams from the first light source 17 and the second light source 21 are controlled in association with the actuation and stop.

Figure 6:
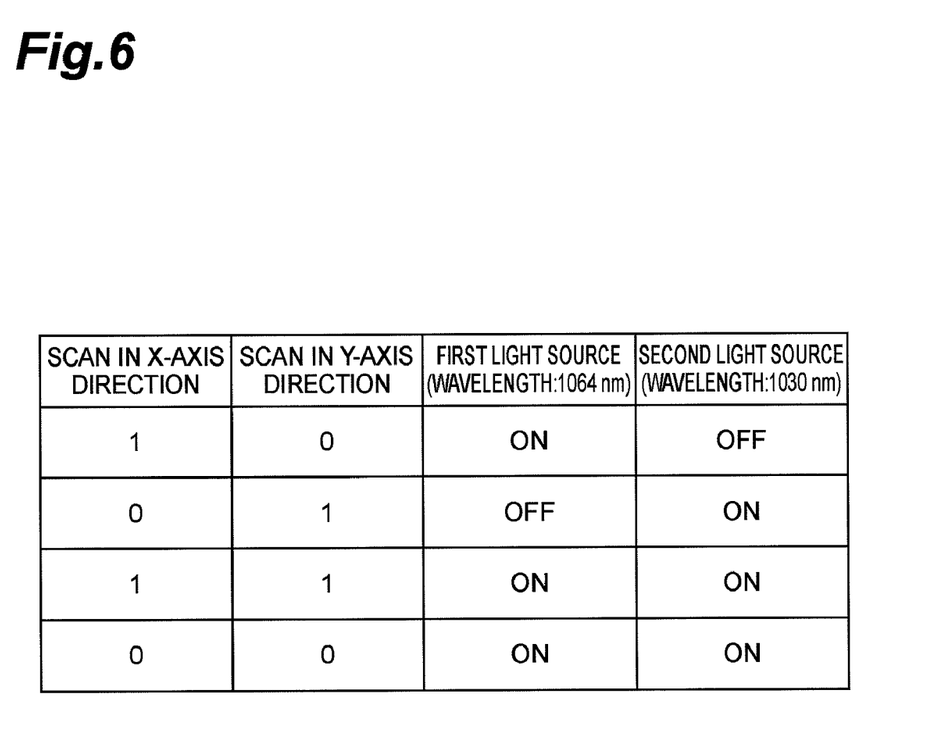
FIG. 6 is a view showing an example of relationship between presence/absence of scan in the X-axis direction and in the Y-axis direction with a galvano scanner, and presence/absence (ON state and OFF state) of output of laser light from first light source 17 and second light source 21.

For laser-processing the workpiece P shown in FIG. 5, the presence/absence of scan in the X-axis direction and in the Y-axis direction by the galvano scanner 100 and the presence/absence of output of the laser light beams from the first light source 17 and the second light source 21 (ON state and OFF state) can be associated, for example, based on FIG. 6. In FIG. 6, "1" indicates a scanning state in a pertinent direction by the galvano scanner 100 and "0" a state in which the galvano scanner 100 stops a scan in a pertinent direction. FIG. 6 also shows a case where the scans in the X-axis direction and in the Y-axis direction both are "0" and a case where the both scans are "1." The reason for it is that the galvano scanner 100 is composed of solenoid motors or the like with low readiness to electric signals and the two cases are provided for states occurring because of the low readiness. Namely, they show control of each of the light sources in cases where the galvano scanner 100 causes transient relaxation oscillation in switching between scan and stop in the X-axis direction or in the Y-axis direction with an electric signal. In such cases, for the purpose of avoiding an optical surge, it is preferable to set the first light source 17 and the second light source 21 in the ON state to make the both light sources output the laser light, in both of the case where the both scans in the X-axis direction and in the Y-axis direction are "0" and the case where the both scans are "1."

Figure 7:
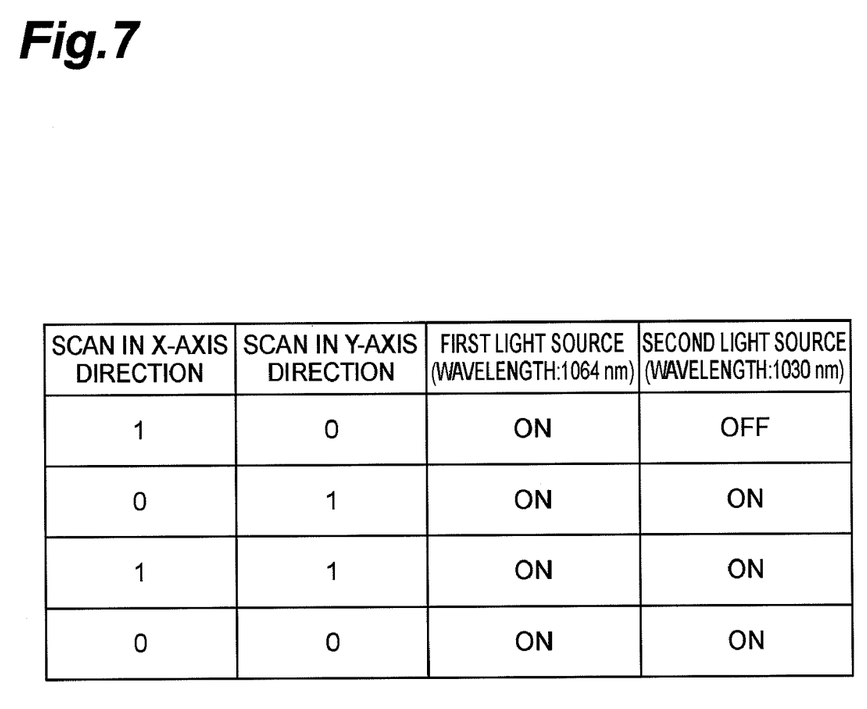
FIG. 7 is a view showing another example of relationship between presence/absence of scan in the X-axis direction and in the Y-axis direction with a galvano scanner, and presence/absence (ON state and OFF state) of output of laser light from first light source 17 and second light source 21.

Instead of the mode in which the first light source 17 and the second light source 21 both are switched between the ON state and the OFF state as shown in FIG. 6, it is also possible to adopt, for example, a mode wherein the first light source 17 is always kept in the ON state and the second light source 21 only is switched between the ON state and the OFF state. FIG. 7 shows a relation between the scanning directions by the galvano scanner and the outputs of the laser light beams from the first light source 17 and the second light source 21 in this case.

As shown in FIG. 7, even in the case where the first light source 17 is always in the ON state, peaks of the pulsed light outputted from the laser light source 1 can be suppressed by use of the second light source. Particularly, in cases where the workpiece is comprised of a material unlikely to be thermally affected, the relation shown in FIG. 7 can be adopted to control the outputs of the laser light beams from the first light source 17 and the second light source 21, whereby it becomes easier to suppress pulse peaks of the pulsed light outputted from the laser light source 1 on the occasion of scanning the irradiation position of the laser light in the Y-axis direction. The above embodiment described the case where the first light source 17 was in the ON state, but the effect of the present embodiment becomes effective by using the second light source in the ON state, in the event that the pump light is driven in the OFF state of the first light source for some reason.

(Second Embodiment)

Figure 8:
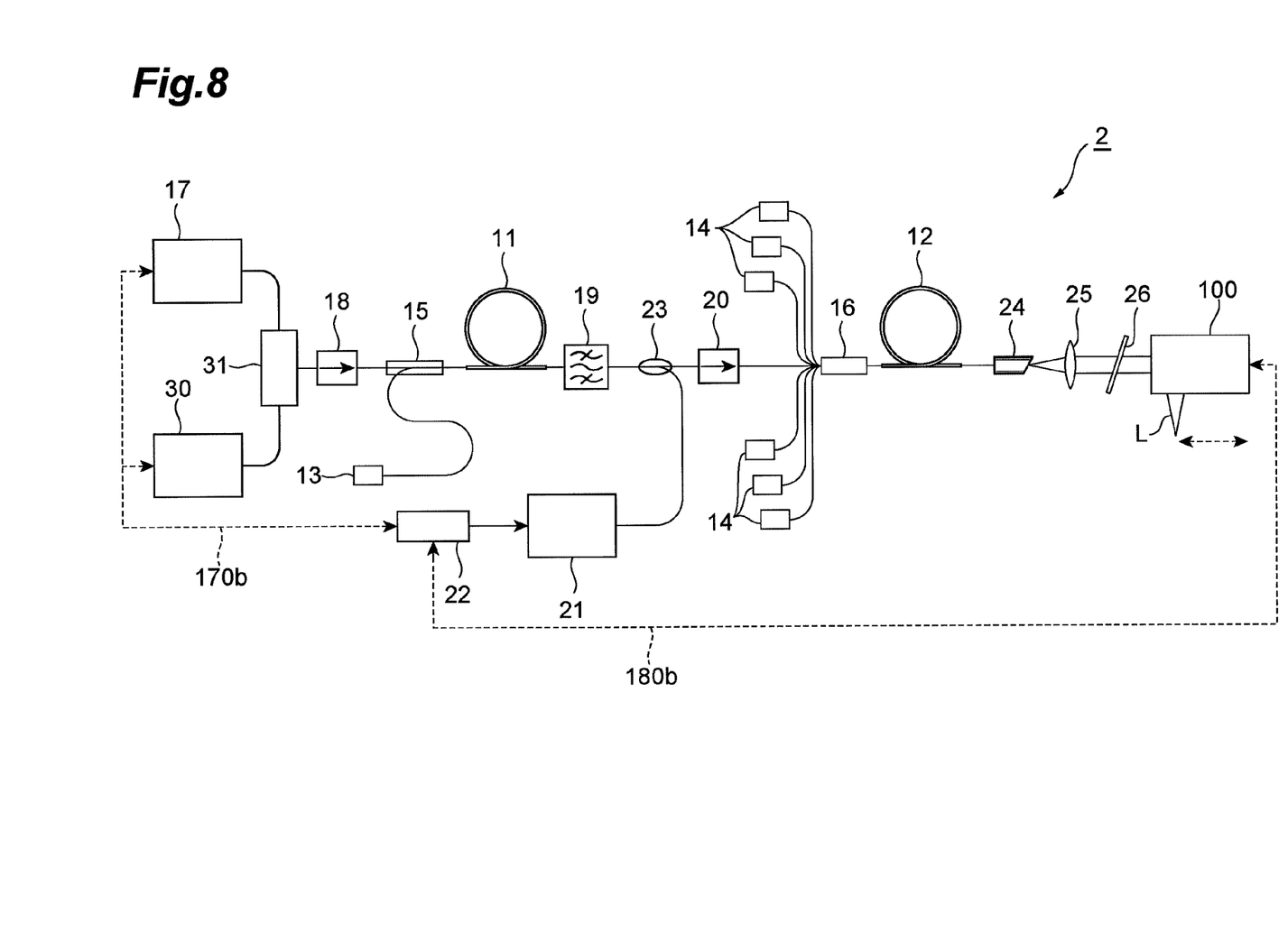
FIG. 8 is a view showing a configuration of a second embodiment of the laser light source according to the present invention.

The second embodiment of the laser light source according to the present invention will be described below. FIG. 8 is a view showing a configuration of the laser light source 2 according to the second embodiment. The laser light source 2 is different in the following points from the laser light source 1. Namely, the differences are that the laser light source 2 has a third light source 30 to output pulsed light with a wavelength different from those of the first light source 17 and the second light source 21, as seed light, and that the pulsed light beam outputted from the first light source 17 and the pulsed light beam outputted from the third light source 30 are multiplexed by a multiplexer 31 and then the multiplexed beams are inputted into the optical isolator 18 and inputted through the combiner 15 into the optical amplification fiber 11. The wavelength of the second light source is desirably different from a wavelength band in which the respective wavelengths of the first light source and the third light source are included. The multiplexer 31 suitably applicable herein is the aforementioned WDM coupler.

In this manner, the seed light of pulsed light outputted from the laser light source 2 can be laser light beams of plural types of wavelengths. As in the first embodiment, the control unit 22 receives through a line 170b, information such as a start (OFF state→ON state) and a stop (ON state→OFF state) of outputs of seed light (pulsed light) from the first light source 17 and from the third light source 30, and controls the output of the laser light (e.g., CW light) from the second light source 21, based on the information. The operation information of the galvano scanner 100 is also received through a line 180b by the control unit 22. In the second embodiment, therefore, the optical surge upon a restart of output of the pulsed light beams from the first light source and the third light source can also be suppressed by outputting the light from the second light source 21 during an OFF time zone in which the outputs of pulsed light from the first light source and the third light source are suspended. It is noted herein that the various modifiable embodiment modes described in the first embodiment may also be applied to the second embodiment.

The above described the various forms for the preferred embodiments of the present invention, but the present invention is by no means limited to the above modes. For example, the above embodiments described the modes using the optical amplification fibers 11, 12 doped with Yb, but it is also possible to use optical amplification fibers doped with Er, instead of Yb. In this case, it is preferable to adopt the wavelength of 1550 nm for the pulsed light outputted from the first light source 17 and the wavelength of 1530 nm for the light outputted from the second light source 21. However, when the intensity of the laser light outputted from the laser light source 1 is made higher, it is preferable to use the optical amplification fibers doped with Yb, for making the wavelengths of the pump light and the light to be amplified (seed light) close to each other, as described above.

The wavelength of the light outputted from the second light source 21 in the OFF state where the output of the seed light from the first light source 17 is halted, is preferably determined near a wavelength of a peak of a spontaneous emission spectrum in the both cases where the rare earth element added in the optical amplification fibers 11, 12 is either of Yb and Er. In this case, the suppression of the optical surge by the light outputted from the second light source 21 becomes more effective.

The above embodiments described the forms using the optical amplification fibers 11, 12 in the optical amplifier, but it is also possible to adopt a mode using solid-state lasers.

As described above, the present invention provides the laser light sources without occurrence of a huge optical surge upon a change from the OFF state to the ON state of the light source to output the pulsed light, in the state in which the pump light is supplied to the optical amplifier so as to maintain thermal equilibrium of the optical amplifier during the OFF state of the light source.

What is claimed is:

1. A laser light source, comprising:
   a first light source outputting light with a first wavelength as pulsed light;
   a second light source outputting light with a second wavelength different from the first wavelength;
   an optical amplifier inputted with pumping light with a third wavelength and amplifying the light outputted from the first light source and the light outputted from the second light source;
   a multiplexer multiplexing the light outputted from the first light source and the light outputted from the second light source, and outputting multiplexed light to the optical amplifier;
   a filter transmitting the light with the first wavelength but blocking the light with the second wavelength out of amplified light outputted from the optical amplifier; and
   a control unit controlling the output of the light from the second light source in accordance with the output of the light from the first light source,
   wherein the first light source has first and second ON states in which repetitive output of the pulsed light on a fixed cycle starts and continues, and an OFF state in which the output of the pulsed light is suspended during a duration of not less than the fixed cycle between the first and second ON states, and
   wherein, while the pumping light is continuously inputted to the optical amplifier between the first and second ON states, the control unit controls the second light source to output the light to the optical amplifier during the duration of the first light source being in the OFF state.

2. The laser light source according to claim 1, wherein the light with the second wavelength is CW light.

3. The laser light source according to claim 1, wherein the control unit controls the second light source to halt the output of the light at the time when a state of the first light source changes from OFF to ON or during a duration of the first light source being in the ON state.

4. The laser light source according to claim 1, wherein the optical amplifier includes an optical fiber doped with an optical amplification element, as an optical amplification medium, and
   wherein a rise time of the light outputted from the second light source is set to be a time of 50%-200% of a pumped-state lifetime of the optical amplification element.

5. The laser light source according to claim 2, wherein the first light source has a preamplifier amplifying and then outputting the light with the first wavelength.

* * * * *